US011146660B2

(12) United States Patent
Zhou

(10) Patent No.: US 11,146,660 B2
(45) Date of Patent: Oct. 12, 2021

(54) INFORMATION PACKET DOWNLOAD METHOD FOR PREVENTING HIGH CONCURRENCY, ELECTRONIC DEVICE AND STORAGE MEDIUM

(71) Applicant: ZHANGYUE TECHNOLOGY CO., LTD, Beijing (CN)

(72) Inventor: Xingbo Zhou, Beijing (CN)

(73) Assignee: ZHANGYUE TECHNOLOGY CO., LTD, Beijing (CN)

( * ) Notice: Subject to any disclaimer, the term of this patent is extended or adjusted under 35 U.S.C. 154(b) by 0 days.

(21) Appl. No.: 16/765,290

(22) PCT Filed: Mar. 22, 2018

(86) PCT No.: PCT/CN2018/080048
§ 371 (c)(1),
(2) Date: May 19, 2020

(87) PCT Pub. No.: WO2019/104911
PCT Pub. Date: Jun. 6, 2019

(65) Prior Publication Data
US 2020/0287990 A1     Sep. 10, 2020

(30) Foreign Application Priority Data

Nov. 30, 2017   (CN) .......................... 201711242264.8

(51) Int. Cl.
*H04L 29/08*     (2006.01)
*G06F 8/65*      (2018.01)
(Continued)

(52) U.S. Cl.
CPC .............. *H04L 67/34* (2013.01); *G06F 8/65* (2013.01); *H04L 47/72* (2013.01); *H04L 67/42* (2013.01)

(58) Field of Classification Search
CPC ......... H04L 67/34; H04L 47/72; H04L 67/42; G06F 8/65
See application file for complete search history.

(56) References Cited

U.S. PATENT DOCUMENTS

2009/0193485 A1\* 7/2009 Rieger ............... H04N 21/2385
725/114
2015/0142481 A1\* 5/2015 McManus .............. G07B 15/02
705/5
(Continued)

FOREIGN PATENT DOCUMENTS

| CN | 104125158 A | * | 10/2014 |
| CN | 104125158 A | | 10/2014 |
| CN | 105681073 A | | 6/2016 |

OTHER PUBLICATIONS

International Patent Application No. PCT/CN2018/080048; Int'l Search Report; dated Aug. 24, 2018; 2 pages.

*Primary Examiner* — Tonia L Dollinger
*Assistant Examiner* — Jihad K Boustany
(74) *Attorney, Agent, or Firm* — BakerHostetler

(57) ABSTRACT

Disclosed are an information packet download method for preventing high concurrency, an electronic device, and a non-volatile computer readable storage medium. The method includes: adjusting a current probability of downloading an information packet based on download environment information; receiving an information packet query request for downloading the information packet from a client, and determining whether to allow the client to download the information packet based on the current probability and the information packet query request; and when it is determined to allow the client to download the information packet, sending a download instruction to the client in response to the information packet query request, to make the client download the information packet.

20 Claims, 4 Drawing Sheets

(51) Int. Cl.
*H04L 12/911* (2013.01)
*H04L 29/06* (2006.01)

(56) References Cited

U.S. PATENT DOCUMENTS

2016/0062759 A1* 3/2016 Lu .............................. G06F 8/65
717/173
2016/0266890 A1* 9/2016 Aleksandrov ............. G06F 8/65

* cited by examiner

INFORMATION PACKET DOWNLOAD METHOD FOR PREVENTING HIGH CONCURRENCY, ELECTRONIC DEVICE AND STORAGE MEDIUM

CROSS REFERENCE TO RELATED APPLICATION

This application is the national phase application of PCT International Application No. PCT/CN2018/080048, filed on Mar. 22, 2018, which based upon and claims priority to Chinese Patent Application NO.201711242264.8, titled "INFORMATION PACKET DOWNLOAD METHOD FOR PREVENTING HIGH CONCURRECNCY, ELECTRONIC DEVICE AND STORAGE MEDIUM ", filed Nov. 30, 2017, the entire contents of which are incorporated herein by reference.

TECHNICAL FIELD

The disclosure relates to the technical field of network, and in particular to an information packet download method for preventing high concurrency, an electronic device, and a non-volatile computer readable storage medium.

BACKGROUND

Silent download is that, when a user starts an application on a terminal, comparing the version information of the application with new version information which stores in a server; when the version of the application is older than the new application, an installation packet of the application corresponding to the new version is directly downloaded to the terminal and installed. The whole process above is performed silently and does not require user to operate manually.

When a size of an application to be downloaded is huge, for example 50M, or when the number of users who need to download the application is great, downloading the application simultaneously by many users will result in that more server bandwidth is occupied, which in one aspect, will cause that server congestion occurs and a download speed is lower, and in the other aspect, as to an enterprise, higher peak bandwidth results in higher cost.

SUMMARY

An information packet download method for preventing high concurrency, an electronic device and a non-volatile computer readable storage medium are provided, to overcome or at least partially solve the above problem.

According to an aspect of the present disclosure, an information packet download method for preventing high concurrency is provided, which includes: adjusting a current probability of downloading an information packet based on download environment information; receiving an information packet query request for downloading the information packet from a client, and determining whether to allow the client to download the information packet based on the current probability and the information packet query request; and when it is determined to allow the client to download the information packet, sending a download instruction to the client in response to the information packet query request, to make the client download the information packet.

According to another aspect of the present disclosure, an electronic device is provided, comprising: at least one processor; and at least one memory, the at least one memory storing executable instructions that upon execution cause the at least one processor to perform operations, the operations comprising: adjusting a current probability of downloading an information packet based on download environment information; receiving an information packet query request for downloading the information packet from a client, and determining whether to allow the client to download the information packet based on the current probability and the information packet query request; and when it is determined to allow the client to download the information packet, sending a download instruction to the client in response to the information packet query request, to make the client download the information packet.

According to another aspect of the present disclosure, a non-volatile computer readable storage medium is provided, storing computer-readable instructions that upon execution by a processor cause the processor to: adjust a current probability of downloading an information packet based on download environment information; receive an information packet query request for downloading the information packet from a client, and determine whether to allow the client to download the information packet based on the current probability and the information packet query request; and when it is determined to allow the client to download the information packet, send a download instruction to the client in response to the information packet query request, to make the client download the information packet.

According to another aspect of the present disclosure, a computer program product is further provided. The computer program product includes computer program stored in the above non-volatile computer readable storage medium.

With the information packet download method for preventing high concurrency, the electronic device, the non-volatile computer readable storage medium and the computer program product according to the present disclosure, adjusting a current probability of downloading an information packet based on download environment information; receiving an information packet query request for downloading the information packet from a client, and determining whether to allow the client to download the information packet based on the current probability and the information packet query request; and when it is determined to allow the client to download the information packet, sending a download instruction to the client in response to the information packet query request, to make the client download the information packet. In the present disclosure, in the basis of the download environment information, it is realized that downloading of the information packet is controllable, thereby avoiding the case that a great number of users simultaneously download the information packet, the bandwidth peak occupied by high concurrent downloading is too high and thus a bandwidth cost for an enterprise is excessive. In addition, the problem of server congestion and a slow download speed due to high concurrent downloading of the information packet is solved, so that the client can download the information packet with a faster download speed, thereby reducing the operation pressure of the server.

The summary of the technical solutions of the present disclosure is described above. The technical means of the present disclosure may be understood clearer according to the content of the specification. In order to make the above and other objects, features and advantages of the present disclosure clearer and easier to be understood, specific embodiments of the present disclosure are described hereinafter.

BRIEF DESCRIPTION OF THE DRAWINGS

According to the detailed description of preferred embodiments of the present disclosure, various other advantages and benefits become clear for those skilled in the art. Drawings are only used to illustrate the preferred embodiments rather than limit the present disclosure. Throughout the drawings, the same components are represented by the same reference numeral. In the drawings:

FIG. 4 is a schematic diagram showing a download probability curve; and.

DETAILED DESCRIPTION

Figure 1:
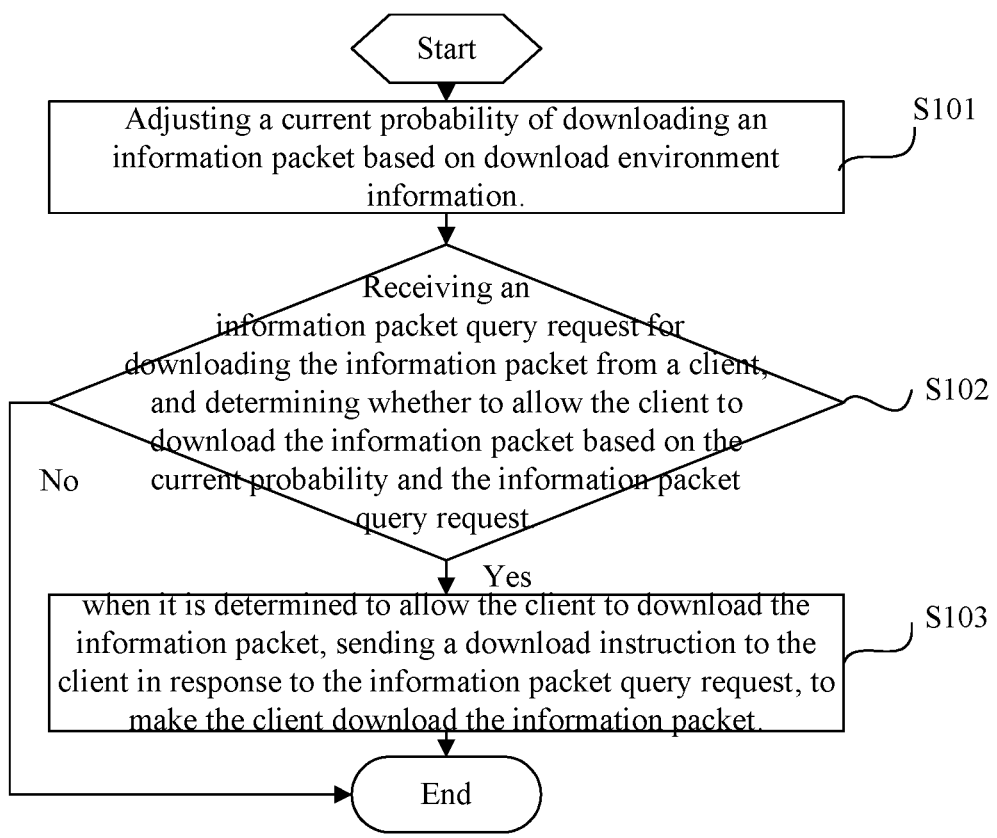
FIG. 1 is a flow chart of an information packet download method for preventing high concurrency in accordance with a first embodiment of the present disclosure.

Hereinafter, exemplary embodiments of the present disclosure will be described in more detail with reference to the accompanying drawings. Although exemplary embodiments of the present disclosure are shown in the drawings, it should be understood that the present disclosure may be implemented in various forms and should not be limited by the embodiments set forth herein. On the contrary, these embodiments are provided to enable a more thorough understanding of the present disclosure, and to fully convey the scope of the present disclosure to those skilled in the art.

First Embodiment

FIG. 1 shows a flowchart of an information packet download method for preventing high concurrency according to a first embodiment of the present disclosure. As shown in FIG. 1, the information packet download method for preventing high concurrency includes the steps as follows:

Step S101, adjusting a current probability of downloading an information packet based on download environment information.

The download environment information includes an available bandwidth for download (for example an available bandwidth is 2 Gbps), the number of users who need downloading, a size of the information packet to be downloaded and so on. Based on the download environment information, the current probability of downloading the information packet is adjusted. Specifically, in a case that the available bandwidth for download is small, the number of users who needs downloading is big and the size of the information packet to be downloaded is big, the current probability of downloading the information packet can set to be a low probability. With decreasing of the number of users who need downloading, the current probability of downloading the information packet is adjusted to be a high probability. Alternatively, in a case that the available bandwidth for download is big enough, the size of the information to be downloaded is very small (only several MByte or hundreds of kByte) and the information packet can be downloaded with a small bandwidth, the current probability of downloading the information packet may be set as a high probability.

Step S102, receiving an information packet query request for downloading the information packet from a client, and determining whether to allow the client to download the information packet based on the current probability and the information packet query request.

The information packet query request for downloading the information packet from the client contains version information of an information packet installed in the client (when the client does not have the information packet installed, there is no version information), user information of the client, and so on. Further, the user information of the client includes account information registered by the client in an application corresponding to the information packet, personal preference information of the user of the client, and so on.

It is determined whether the client needs to download the information packet by comparing the version information of the information packet installed in the client with version information of an information packet in a server. Specifically, when the version information of the information packet installed in the client differs from the version information of the information packet in the server, the client needs to download the information packet. Alternatively, when based on user information of the client, it is determined that the information packet is suitable for the client and the information packet is not yet installed in the client, it may be considered that the client needs to download the information packet. Further, a random function is created based on the current probability, to generate a download-allowable interval. For example, when the current probability is 30%, an download-allowable interval of 0-0.3 is generated. In this case, download is allowed when the random function value falls within the interval of 0-0.3, and download is not allowed when the random function value falls within the interval of 0.4-1. Based on the information packet query request for downloading the information packet from the client, a download random value is generated for the client by using the random function. In a process of generating a download random value, the download random value may be slightly adjusted based on the account information of the client contained in the information packet query request. For example, a login information, the number of usage of the application corresponding to the information packet by the client, the usage frequency, an update frequency, update time and so on is acquired based on the account information, and the client set an amplitude for slightly adjusting the download random value based on login information, the number of usage of the application, the usage frequency, the update frequency, the update time corresponding to each different client. It is determined whether the download random value for the client falls within the download-allowable interval. When the download random value is 0.2 and falls within the download-allowable interval of 0-0.3, step S103 is performed in response to the information packet query request for downloading the information packet from the client. When the download random value is 0.5 and goes beyond the download-allowable interval of 0-0.3, in response to the information packet query request for downloading the information packet from the client, a download instruction can't be sent to the client and the client will not proceed with download the information packet, and alternatively, an instruction for not downloading is sent to the client and the client will not download the information packet. That is, the client will not continue to perform operations related to downloading of the information packet, and will not send the information packet download request any more.

It is determined whether the client needs to download the information packet by comparing the version information of the information packet installed in the client with the version information of the information packet in the server. Specifically, when the version information of the information packet installed in the client is the same as the version information of the information packet in the server, the client does not need to download the information packet and thus it is unnecessary to send a download instruction to the client, and the client will not continue to perform operations related to downloading of the information packet, and will not send the information packet download request.

Step S103, when it is determined to allow the client to download the information packet, sending a download instruction to the client in response to the information packet query request, to make the client download the information packet.

In a case that it is determined that the client needs to download the information packet, the download instruction is sent to the client, so that the client parses the download instruction. The download instruction may include an information packet download address. After parsing the download instruction, the client obtains a definite instruction that downloading the information packet is allowable, the client sends an information packet download request to a server based on the information packet download address included in the download instruction, to download the information packet. Alternatively, in a case that the download instruction does not include the information packet download address, when by parsing the download instruction the client obtains the definite instruction that downloading the information packet is allowable, the client sends an information packet download request to the server based on an information packet download address built-in the client, to download the information packet.

The information packet may be an application installation packet, an update plug-in, an emoji packet, and so on. The client performs different operations based on specific content in the information packet. When the information packet is an application installation packet, the client automatically installs the application packet after downloading the information packet. When the information packet is an update plug-in, the client automatically updates the update plug-in after downloading the information packet. When the information packet is an emoji packet, the client automatically sets the emoji packet after downloading the information packet.

With the information packet download method for preventing high concurrency according to the present disclosure, adjusting a current probability of downloading an information packet based on download environment information; receiving an information packet query request for downloading the information packet from a client, and determining whether to allow the client to download the information packet based on the current probability and the information packet query request; and when it is determined to allow the client to download the information packet, sending a download instruction to the client in response to the information packet query request, to make the client download the information packet. In the present disclosure, in the basis of the download environment information, it is realized that downloading of the information packet is controllable, thereby avoiding the case that a great number of users simultaneously download the information packet, the bandwidth peak occupied by high concurrent downloading is too high and thus a bandwidth cost for an enterprise is excessive. In addition, the problem of server congestion and a slow download speed due to high concurrent downloading of the information packet is solved, so that the client can download the information packet with a faster download speed, thereby reducing the operation pressure of the server.

Second Embodiment

Figure 2:
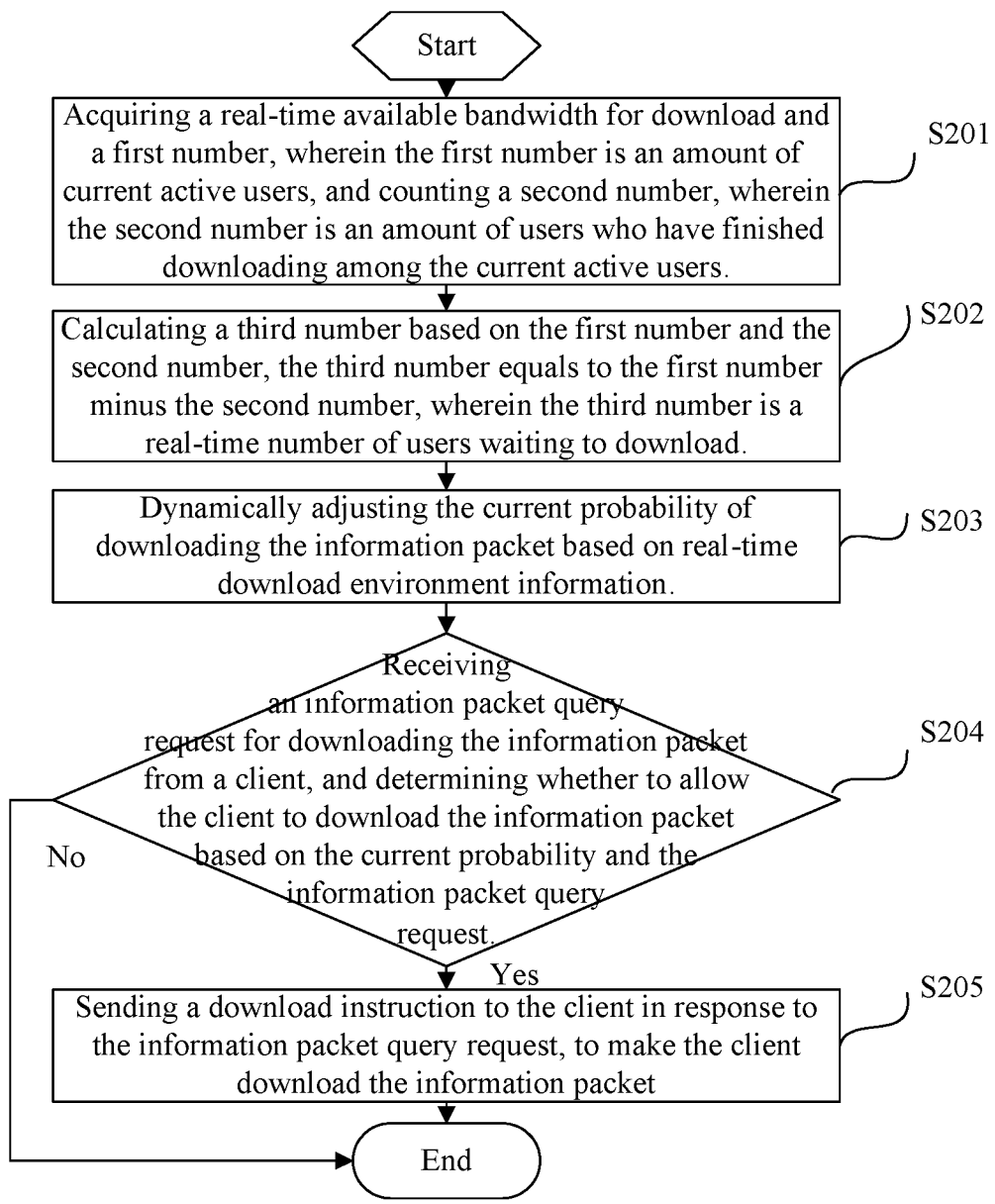
FIG. 2 is a flow chart of an information packet download method for preventing high concurrency in accordance with a second embodiment of the present disclosure.

FIG. 2 shows a flowchart of an information packet download method for preventing high concurrency according to a second embodiment of the present disclosure. As shown in FIG. 2, the information packet download method for preventing high concurrency includes the steps as follows.

Step S201, acquiring a real-time available bandwidth for download and a first number, wherein the first number is an amount of current active users, and counting a second number, wherein the second number is an amount of users who have finished downloading among the current active users.

Step S202, calculating a third number based on the first number and the second number, the third number equals to the first number minus the second number, wherein the third number is a real-time number of users waiting to download.

The real-time available bandwidth for download may be obtained based on a bandwidth purchased by an enterprise and a real-time bandwidth occupied currently. The available bandwidth for download equals to the purchased bandwidth minus the real-time bandwidth occupied currently.

The first number (the amount of current active users) may be obtained by manners such as check-in, login, clicking a page, sending an information packet download request, and so on. The second number (amount of users who have finished downloading among the current active users) may be counted by comparing the version information of the information packet of the client with the version information of the information packet in the server. When the version of the information packet of the client is the same as the version information of the information packet in the server, the user is determined as a user who has finished downloading. Alternatively, after the client downloads the information packet, a user of the client is marked as a user who has finished downloading, thereby counting the amount of users who have finished downloading. The real-time number of users who need downloading equals to the amount of current active users minus the amount of users who have finished downloading.

Since the real-time available bandwidth for download, the first number and the second number is changeable in real time, the obtained real-time available bandwidth for download and the third number also change in real time.

Step S203, dynamically adjusting the current probability of downloading the information packet based on real-time download environment information.

The current probability of downloading the information packet may be dynamically adjusted based on the real-time available bandwidth for download and the real-time number of users who need downloading included in the real-time download environment information and an constant size of an information packet to be downloaded. Specifically, for example, the real-time available bandwidth for download is divided by the size of the information packet to be downloaded and then divided by the real-time number of users who need downloading, to obtain a value, which is used for determining a current probability of downloading the information packet. Since the real-time available bandwidth for download and the real-time number of users who need downloading may be changeable in real time, the real-time number of users who need downloading decreases as the amount of users who have finished downloading increases, and the current probability of downloading the information packet is dynamically adjusted accordingly, so that the current probability of downloading the information packet increasingly approaches 100%.

Further, the current probability of downloading the information packet obtained in the basis of the value may be adjusted slightly to prevent other possible sudden bandwidth consumption. For example, when the current probability of downloading the information packet is 40%, the current probability may be slightly adjusted to be 30%, to reserve a part of bandwidth to deal with possible sudden bandwidth consumption.

Step S204, receiving an information packet query request for downloading the information packet from a client, and determining whether to allow the client to download the information packet based on the current probability and the information packet query request.

Step S205, when it is determined to allow the client to download the information packet, sending a download instruction to the client in response to the information packet query request, to make the client download the information packet.

The above steps S204 to S205 may refer to the description of steps S102-S103 in the first embodiment, which will not be repeated here.

With the information packet download method for preventing high concurrency according to the present disclosure, the current probability of downloading the information packet is dynamically adjusted based on the real-time download environment information, so that the downloading of the information packet is more in line with the current download environment, thereby effectively avoiding the case that the bandwidth peak occupied by downloading is too high and improving the case that a bandwidth cost for an enterprise is excessive. In addition, the problem of server congestion and a slow download speed due to high concurrent downloading of the information packet is solved, so that the user may download the information packet with a high download speed, thereby reducing the operation pressure of the server.

Third Embodiment

Figure 3:
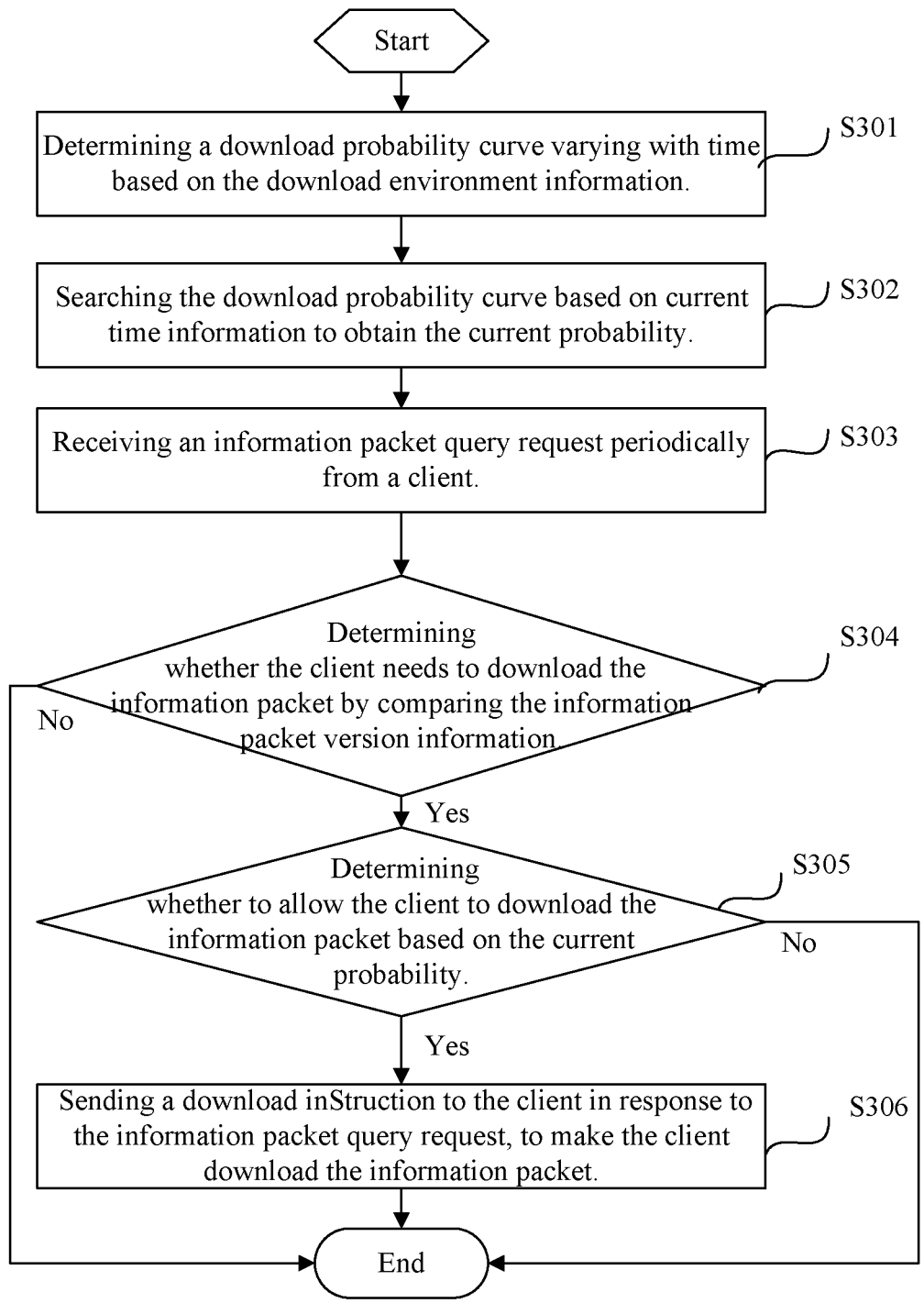
FIG. 3 is a flow chart of an information packet download method for preventing high concurrency in accordance with a third embodiment of the present disclosure.

FIG. 3 shows a flowchart of an information packet download method for preventing high concurrency according to a third embodiment of the present disclosure. As shown in FIG. 3, the information packet download method for preventing high concurrency includes the steps as follows.

Step S301, determining a download probability curve varying with time based on the download environment information.

Figure 4:
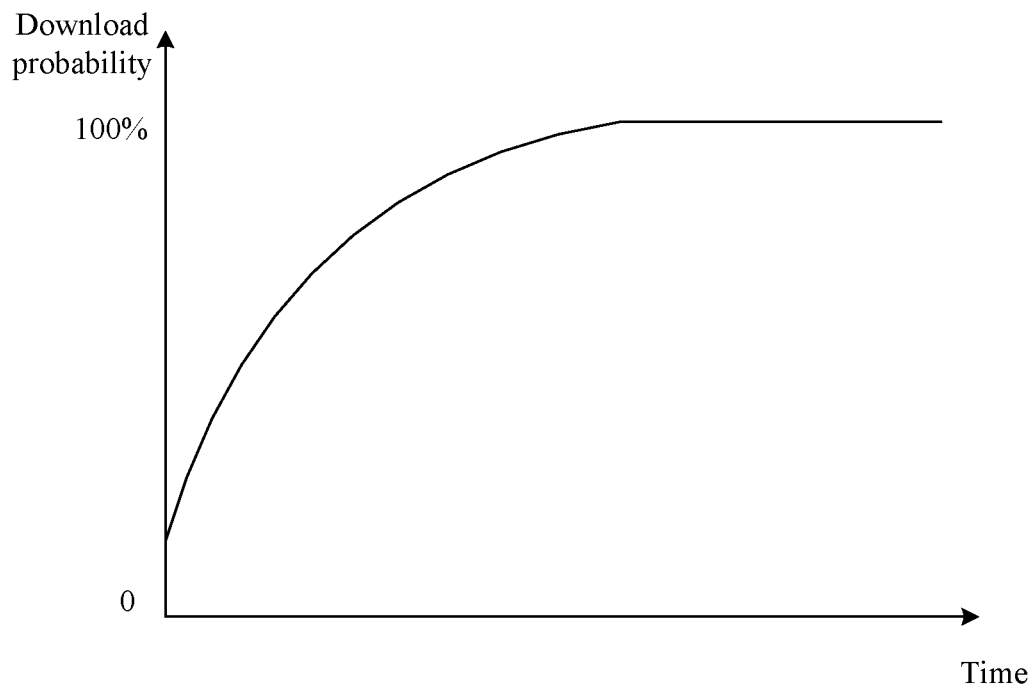

A download probability curve varying with time may be predetermined based on information such as a available bandwidth for download, the number of users who need downloading and a size of an information packet to be downloaded in the download environment information. At the beginning, since the number of users who need downloading is big, a corresponding download probability is low. As time elapses, the number of users who need downloading decreases, and the corresponding download probability is adjusted to be high, thereby forming a download probability curve varying with time. In a schematic diagram of the download probability curve as shown in FIG. 4, a horizontal axis represents time, and a longitudinal axis represents a download probability. At the beginning for downloading the information packet, the download probability is low. As time elapses, the download probability is adjusted to be higher and higher gradually, until the download probability is 100%, that is, any client is allowed to download the information packet.

The download probability curve may be predetermined based on pre-collected information such as an available bandwidth for download, the number of users who need downloading and the size of the information packet to be downloaded. However, the download probability curve may change with time, and may be adjusted accordingly based on the varying available bandwidth and the varying number of users who need downloading during an actual download process.

Step S302, searching the download probability curve based on current time information to obtain the current probability.

The horizontal axis of the download probability curve is searched based on the current time information, to obtain a current probability of downloading an information packet corresponding to the longitudinal axis.

Step S303, receiving an information packet query request periodically from a client is received.

Step S304, determining whether the client needs to download the information packet by comparing the information packet version information.

The information packet query request contains version information of an information packet installed in the client (when the client does not have the information packet installed, there is no version information), user information of the client, and so on. Further, the user information of the client includes account information registered by the client in an application corresponding to the information packet, personal preference information of a user of the client, and so on.

The client may send an information packet query request at startup, at start of the application or according to a preset period. The client may send information packet query request only once within one preset period, for example sending only once within one day or a time interval. The preset period is determined according to the implementation. After the information packet query request sent periodically by the client is received, it is determined firstly whether version information of a local information packet of the client is the same as version information of an information packet to be downloaded in the server. When the version information is the same, don't send a download instruction to the client, and the client will not continue to perform operations related to downloading of the information packet, and will not send the information packet download request. When the version information is different and a version information of the local information packet in the client is older than a version information of the information packet to be downloaded in the server, it is determined that the client needs to download the information packet, and step S305 is performed.

In a case that the information packet query request does not contain the version information of the information packet installed in the client, that is, the client does not have the information packet installed, it is determined that the client needs to download the information packet and step S305 is performed. Further, it may be determined whether the information packet is suitable for the client based on user information of the client. When it is determined that the information packet is suitable for the client based on usage preference information of the user of the client, it may be determined that the client needs to download the information packet and step S305 is performed.

Step S305, determining whether to allow the client to download the information packet based on the current probability.

Step S306, sending a download instruction to the client in response to the information packet query request, to make the client download the information packet.

The above steps S305 to S306 may refer to the description of steps S102-S103 in the first embodiment, which will not be repeated here.

With the information packet download method for preventing high concurrency according to the present disclosure, the download probability curve varying with time is preset based on download environment information, and the download probability curve is searched based on the current time information, to obtain the current probability of downloading the information packet. Based on the obtained current probability and in response to the information packet query request, the download instruction is sent to the client, to make the client download the information packet, thereby avoiding the case that the bandwidth peak occupied by downloading is too high and thus the bandwidth cost of the enterprise is excessive. Further, as time elapses, the download probability curve may be adjusted accordingly based on the download environment information during an actual download process such as the varying available bandwidth and the varying number of users who need downloading, so as to more adapt to the current download environment and achieve a better download effect. The received information packet query request sent periodically by the client is determined. Only when the client needs to perform downloading, a response is made to allow the client to download the information packet, thereby avoiding repeated downloading of the information packet and thus avoiding unnecessary waste of the bandwidths of both the client and the server.

Fourth Embodiment

A non-volatile computer readable storage medium is provided according to a fourth embodiment. The non-volatile computer readable storage medium stores at least one executable instruction which can perform the information packet download method for preventing high concurrency in any of the above method embodiments.

The executable instruction may cause a processor to:

adjust a current probability of downloading an information packet based on download environment information;

receive an information packet query request for downloading the information packet from a client, and determine whether to allow the client to download the information packet based on the current probability and the information packet query request; and when it is determined to allow the client to download the information packet, send a download instruction to the client in response to the information packet query request, to make the client download the information packet.

In an optional embodiment, the download environment information includes at least one of an available bandwidth for download, a number of users who need downloading, or a size of the information packet to be downloaded.

In an optional embodiment, the executable instruction causes the processor to further perform operations of: acquiring a real-time available bandwidth for download and a first number, wherein the first number is an amount of current active users, and counting a second number, wherein the second number is an amount of users who have finished downloading among the current active users; calculating a third number based on the first number and the second number, the third number equals to the first number minus the second number, wherein the third number is a real-time number of users waiting to download; and dynamically adjusting the current probability of downloading the information packet based on real-time download environment information.

In an optional embodiment, the executable instruction causes the processor to further perform operations of: determining a download probability curve varying with time based on the download environment information; and searching the download probability curve based on current time information to obtain the current probability.

In an optional embodiment, the executable instruction causes the processor to further perform operations of: creating a random function based on the current probability to generate a download-allowable interval; receiving the information packet query request from the client, and generating a download random value for the client by using the random function; and determining whether the download random value for the client falls within the download-allowable interval, and when the download random value falls within the download-allowable interval, sending the download instruction to the client in response to the request, to make the client download the information packet.

In an optional embodiment, the executable instruction causes the processor to perform operations of: receiving an information packet query request sent periodically by the client, wherein the information packet query request contains information packet version information of the client or user information of the client; determining whether the client needs to download the information packet by comparing the information packet version information; and when it is determined that the client needs to download the information packet, determining whether to allow the client to download the information packet based on the current probability.

Fifth Embodiment

Figure 5:
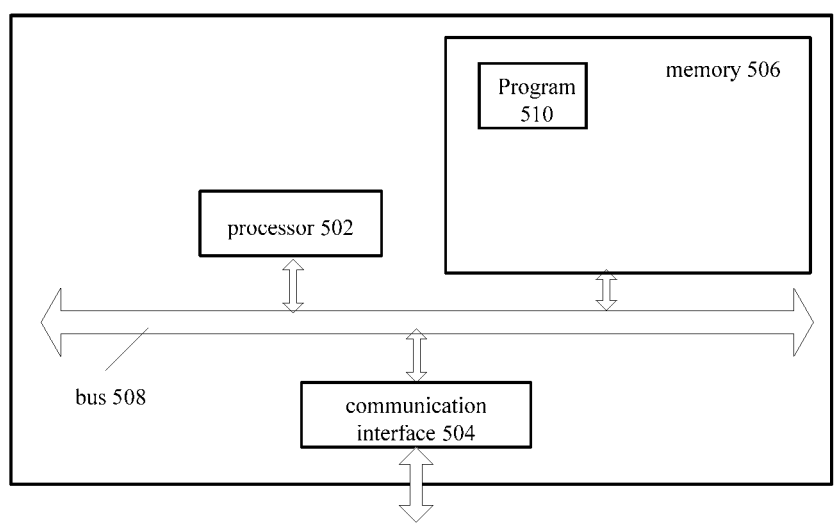
FIG. 5 is a schematic structural diagram of an electronic device according to a fifth embodiment of the present disclosure.

FIG. 5 is a schematic structural diagram of an electronic device according to a fifth embodiment of the present disclosure. Specific embodiments of the present disclosure are not intended to limit implementation of the electronic device.

As shown in FIG. 5, the electronic device may include: a processor 502, a communication interface 504, a memory 506 and a communication bus 508.

The processor 502, the communication interface 504 and the memory 506 perform communication with each other via the communication bus 508.

The communication interface 504 is configured to perform network element communication with a client or other server.

The processor 502 is configured to perform programs 510, and specifically, may perform related steps in the embodiments of the information packet download method for preventing high concurrency.

Specifically, the programs 510 may include program codes including computer operation instructions.

The processor 502 may be a central processing unit CPU or an application specific integrated circuit (ASIC), or one or more integrated circuits configured to implement the embodiments of the present disclosure. The one or more processors included in the server may be of the same type, for example one or more CPU; or may be of different types, for example, one or more CPU and one or more ASIC.

The memory 506 is configured to store the programs 510. The memory 506 may be a high speed RAM, or may be a non-volatile memory, for example at least one magnetic disk memory.

The programs 510 may cause the processor to perform the following operations.

In an optional embodiment, the programs 510 cause the processor 502 to perform operations of: adjusting a current probability of downloading an information packet based on download environment information; receiving an information packet query request for downloading the information packet from a client, and determining whether to allow the client to download the information packet based on the current probability and the information packet query request; and when it is determined to allow the client to download the information packet, sending a download instruction to the client in response to the information packet query request, to make the client download the information packet.

In an optional embodiment, the download environment information includes at least one of an available bandwidth for download, a number of users who need downloading, or a size of the information packet to be downloaded.

In an optional embodiment, the programs 510 cause the processor 502 to perform operations of: acquiring a real-time available bandwidth for download and a first number, wherein the first number is an amount of current active users, and counting a second number, wherein the second number is an amount of users who have finished downloading among the current active users; calculating a third number based on the first number and the second number, the third number equals to the first number minus the second number, wherein the third number is a real-time number of users waiting to download; and dynamically adjusting the current probability of downloading the information packet based on real-time download environment information.

In an optional embodiment, the programs 510 cause the processor 502 to perform operations of: determining a download probability curve varying with time based on the download environment information; and searching the download probability curve based on current time information to obtain the current probability.

In an optional embodiment, the programs 510 cause the processor 502 to perform operations of: creating a random function based on the current probability to generate a download-allowable interval; receiving the information packet query request from the client, and generating a download random value for the client by using the random function; and determining whether the download random value for the client falls within the download-allowable interval, and when the download random value falls within the download-allowable interval, sending the download instruction to the client in response to the request, to make the client download the information packet.

In an optional embodiment, the programs 510 cause the processor 502 to perform operations of: receiving an information packet query request sent periodically by the client, wherein the information packet query request contains information packet version information of the client or user information of the client; determining whether the client needs to download the information packet by comparing the information packet version information; and when it is determined that the client needs to download the information packet, determining whether to allow the client to download the information packet based on the current probability.

For implementation of steps regarding the programs 510, one may refer to the description of corresponding steps in the embodiments of the information packet download method for preventing high concurrency, and details are not repeated herein. It should be understood by those skilled in the art that for specific operation processes of the device and module described above, one may refer to the corresponding description in the above method embodiments, for convenience and clarity. Details are not repeated herein.

With the solution according to the present embodiment, the current probability of downloading the information packet is adjusted based on the download environment information; the information packet query request for downloading the information packet from the client is received, and it is determined whether to allow the client to download the information packet based on the current probability and the information packet query request; and when it is determined to allow the client to download the information packet, the download instruction is sent to the client in response to the information packet query request, to make the client download the information packet. In the present disclosure, in the basis of the download environment information, it is realized that downloading of the information packet is controllable, thereby avoiding the case that a great number of users simultaneously download the information packet, the bandwidth peak occupied by high concurrent downloading is too high and thus a bandwidth cost for an enterprise is excessive. In addition, the problem of server congestion and a slow download speed due to high concurrent downloading of the information packet is solved, so that the user may download the information packet with a faster download speed, thereby reducing the operation pressure of the server.

A large number of details are illustrated here in the specification. However, it should be understood that the embodiments of the present disclosure may be implemented without these details. In some examples, well-known methods, structures and technology are not illustrated in detail, so as not to obscure understanding of the present disclosure.

Similarly, it should be understood that, for simplifying the present disclosure and assisting understanding one or more of aspects of the present disclosure, features of the present disclosure are provided in a single embodiment, drawing or description thereof, in the description of the schematic embodiments of the present disclosure above. However, the method according to the present disclosure should not be interpreted as follows: the claimed disclosure has more features than those recited definitely in each claim. More definitely, as shown by the claims attached below, each claim recites less features than those disclosed in a single embodiment. Therefore, a claim corresponding to a certain embodiment is definitely incorporated into the embodiment, and each claim functions as a single embodiment of the present disclosure.

Those skilled in the art should understand that modules in the device of the embodiment may be changed adaptively and may be arranged in one or more devices, different from the embodiment herein. The modules, units or components in the embodiment may be combined into one module, unit or component, and the module, unit or component may be divided into multiple sub-modules, subunits or subcomponents. Unless the features and/or processes or units conflict with each other, all features disclosed in the specification (including the accompanying claims, abstract and drawings) and all processes or units in the method or device in the present disclosure may be combined in any manner. Unless definitely illustrated, each feature disclosed in the specification (including the accompanying claims, abstract and drawings) may be replaced with alternative features which may achieve the same, equivalent or similar object.

In addition, those skilled in the art should understand that although some embodiments described here include certain features rather than all features included in other embodiments, different embodiments can be formed by combining of features of different embodiments within the scope of the present disclosure. For example, in the following claims, the claimed embodiments may be used by combining in any manner.

It should be understood that the above embodiments are used to illustrate the present disclosure rather than limiting the present disclosure, and alternative embodiments may be designed by those skilled in the art without departing from the scope of the attached claims. In the claims, any reference symbol in the parentheses should not be constructed as limiting the claims. The term "comprising" does not preclude elements or steps not listed in the claims. Element defined by "a" or "an" does not preclude that there are multiple elements. The present disclosure may be implemented by hardware including several different elements and appropriate programming by means of a computer. Terms of first, second and third and so on do not represent any order. The terms may be explained as names.

What is claimed is:

1. An information packet download method for preventing high concurrency, comprising:
    adjusting a current probability of downloading an information packet based on download environment information, wherein the adjusting a current probability of downloading an information packet based on download environment information further comprises:
        determining a download probability curve varying with time based on the download environment information, and searching the download probability curve based on current time information to obtain the current probability;
        receiving an information packet query request for downloading the information packet from a client, and determining whether to allow the client to download the information packet based on the current probability and the information packet query request; and
    when it is determined to allow the client to download the information packet, sending a download instruction to the client in response to the information packet query request, to make the client download the information packet.

2. The method according to claim 1, wherein the download environment information comprises at least one of an available bandwidth for download, a number of users who need downloading, or a size of the information packet to be downloaded.

3. The method according to claim 2, further comprising:
    acquiring a real-time available bandwidth for download and a first number, wherein the first number is an amount of current active users, and counting a second number, wherein the second number is an amount of users who have finished downloading among the current active users; and
    calculating a third number based on the first number and the second number, the third number equals to the first number minus the second number, wherein the third number is a real-time number of users waiting to download,
    wherein the adjusting a current probability of downloading the information packet based on download environment information comprises: dynamically adjusting the current probability of downloading the information packet based on real-time download environment information.

4. The method according to claim 3, wherein the receiving an information packet query request for downloading the information packet from a client, and determining whether to allow the client to download the information packet based on the current probability and the information packet query request further comprises:
    creating a random function based on the current probability to generate a download-allowable interval;
    receiving the information packet query request from the client, and generating a download random value for the client by using the random function; and
    determining whether the download random value for the client falls within the download-allowable interval, and
    when the download random value falls within the download-allowable interval, sending the download instruction to the client in response to the request, to make the client download the information packet.

5. The method according to claim 3,
    wherein the receiving an information packet query request for downloading the information packet from a client further comprises receiving the information packet query request sent periodically by the client, wherein the information packet query request contains information packet version information of the client or user information of the client; and
    wherein after the receiving an information packet query request for downloading the information packet from a client, the method further comprises:
    determining whether the client needs to download the information packet by comparing the information packet version information; and
    when it is determined that the client needs to download the information packet, determining whether to allow the client to download the information packet based on the current probability.

6. The method according to claim 1, wherein the receiving an information packet query request for downloading the information packet from a client, and determining whether to allow the client to download the information packet based on the current probability and the information packet query request further comprises:
    creating a random function based on the current probability to generate a download-allowable interval;
    receiving the information packet query request from the client, and generating a download random value for the client by using the random function; and
    determining whether the download random value for the client falls within the download- allowable interval, and
    when the download random value falls within the download-allowable interval, sending the download instruction to the client in response to the request, to make the client download the information packet.

7. The method according to claim 1, wherein the receiving an information packet query request for downloading the information packet from a client further comprises receiving the information packet query request sent periodically by the client, wherein the information packet query request contains information packet version information of the client or user information of the client; and wherein after the receiving an information packet query request for downloading the information packet from a client, the method further comprises:
determining whether the client needs to download the information packet by comparing the information packet version information; and
when it is determined that the client needs to download the information packet, determining whether to allow the client to download the information packet based on the current probability.

8. The method according to claim 1, wherein the receiving an information packet query request for downloading the information packet from a client, and determining whether to allow the client to download the information packet based on the current probability and the information packet query request further comprises:
creating a random function based on the current probability to generate a download-allowable interval;
receiving the information packet query request from the client, and generating a download random value for the client by using the random function; and
determining whether the download random value for the client falls within the download-allowable interval, and
when the download random value falls within the download-allowable interval, sending the download instruction to the client in response to the request, to make the client download the information packet.

9. An electronic device, comprising:
at least one processor; and
at least one memory, the at least one memory storing executable instructions that upon execution cause the at least one processor to perform operations, the operations comprising:
adjusting a current probability of downloading an information packet based on download environment information;
receiving an information packet query request for downloading the information packet from a client, and determining whether to allow the client to download the information packet based on the current probability and the information packet query request;
when it is determined to allow the client to download the information packet, sending a download instruction to the client in response to the information packet query request, to make the client download the information packet
wherein the operations further comprise:
determining a download probability curve varying with time based on the download environment information; and
searching the download probability curve based on current time information to obtain the current probability.

10. The electronic device according to claim 9, wherein the download environment information comprises at least one of an available bandwidth for download, a number of users who need downloading, or a size of the information packet to be downloaded.

11. The electronic device according to claim 10, wherein the operations further comprise:
acquiring a real-time available bandwidth for download and a first number, wherein the first number is an amount of current active users, and counting a second number, wherein the second number is an amount of users who have finished downloading among the current active users;
calculating a third number based on the first number and the second number, the third number equals to the first number minus the second number, wherein the third number is a real-time number of users waiting to download; and
dynamically adjusting the current probability of downloading the information packet based on real-time download environment information.

12. The electronic device according to claim 11, wherein the operations further comprise:
creating a random function based on the current probability to generate a download-allowable interval;
receiving the information packet query request from the client, and generate a download random value for the client by using the random function; and
determining whether the download random value for the client falls within the download-allowable interval, and when the download random value falls within the download-allowable interval, send the download instruction to the client in response to the request, to make the client download the information packet.

13. The electronic device according to claim 11, wherein the operations further comprise:
receiving an information packet query request sent periodically by the client, wherein the information packet query request contains information packet version information of the client or user information of the client;
determining whether the client needs to download the information packet by comparing the information packet version information; and
when it is determined that the client needs to download the information packet, determining whether to allow the client to download the information packet based on the current probability.

14. The electronic device according to claim 9, wherein the operations further comprise:
creating a random function based on the current probability to generate a download-allowable interval;
receiving the information packet query request from the client, and generating a download random value for the client by using the random function; and
determining whether the download random value for the client falls within the download-allowable interval, and when the download random value falls within the download-allowable interval, sending the download instruction to the client in response to the request, to make the client download the information packet.

15. The electronic device according to claim 9, wherein the operations further comprise:
receiving the information packet query request sent periodically by the client, wherein the information packet query request contains information packet version information of the client or user information of the client;
determining whether the client needs to download the information packet by comparing the information packet version information; and
when it is determined that the client needs to download the information packet, determining whether to allow the client to download the information packet based on the current probability.

16. The electronic device according to claim 9, wherein the operations further comprise:
creating a random function based on the current probability to generate a download-allowable interval;

receiving the information packet query request from the client, and generate a download random value for the client by using the random function; and determining whether the download random value for the client falls within the download-allowable interval, and when the download random value falls within the download-allowable interval, sending the download instruction to the client in response to the request, to make the client download the information packet.

17. A non-transitory computer readable storage medium, storing executable instructions that upon execution by a processor cause the processor to:

adjust a current probability of downloading an information packet based on download environment information;

receive an information packet query request for downloading the information packet from a client, and determine whether to allow the client to download the information packet based on the current probability and the information packet query request;

when it is determined to allow the client to download the information packet, send a download instruction to the client in response to the information packet query request, to make the client download the information packet;

wherein the non-transitory computer readable storage medium further stores executable instructions that upon execution by the processor cause the processor to:

determine a download probability curve varying with time based on the download environment information; and search the download probability curve based on current time information to obtain the current probability.

18. The non-transitory computer readable storage medium of claim 17, wherein the download environment information comprises at least one of an available bandwidth for download, a number of users who need downloading, or a size of the information packet to be downloaded.

19. The non-transitory computer readable storage medium of claim 17, further storing executable instructions that upon execution by the processor cause the processor to:

create a random function based on the current probability to generate a download-allowable interval;

receive the information packet query request from the client, and generate a download random value for the client by using the random function;

determine whether the download random value for the client falls within the download-allowable interval; and send the download instruction to the client in response to the request so as to make the client download the information packet when the download random value falls within the download-allowable interval.

20. The non-transitory computer readable storage medium of claim 13, further storing executable instructions that upon execution by the processor cause the processor to:

receive the information packet query request sent periodically by the client, wherein the information packet query request contains information packet version information of the client or user information of the client;

determine whether the client needs to download the information packet by comparing the information packet version information; and determine whether to allow the client to download the information packet based on the current probability when it is determined that the client needs to download the information packet.

* * * * *